Patented May 17, 1932

1,858,958

UNITED STATES PATENT OFFICE

MORRIS S. KHARASCH, OF COLLEGE PARK, MARYLAND

ORGANIC SELENO COMPOUND

No Drawing.  Application filed August 14, 1926.  Serial No. 129,291.

The present invention relates to the production of water soluble organo-metallic compounds, and particularly of such compounds in which the metal has a valence greater than one, one of its valence bonds being attached to an organic radical, either aliphatic or cyclic.

The invention is of particular importance in connection with the organic compounds having germicidal or therapeutic value, such as compounds of mercury, arsenic, bismuth, antimony and the like, the efficiency of which has hitherto been greatly limited by the difficulty of producing water soluble compounds.

In carrying out the process of my invention, I react upon an organo-metallic compound with a water or an alkali soluble compound containing the selenyl group (—SeH), of which H—Se—R$_{Ac}$ represents a typical formula, in which R$_{Ac}$ is an aliphatic or aromatic radical containing an acid group and of which seleno-salicyclic acid.

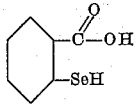

is a simple example. I may, however, use instead of selenyl compounds containing a carboxyl group, or groups, other compounds as the occasion may demand, such as the sulfonic acid derivatives of the selenyl compounds, i. e., selenyl G acid

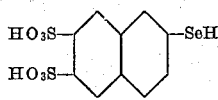

or any other substituted selenyl acids.

A typical formula for the organo-metallic compounds reacted upon is as follows—R—Hg—X in which R is any organic radical having the Hg attached to a carbon atom and in which X is any replaceable inorganic radical or group. It is to be noted that elements of the sulfur family, that is, sulfur, selenium and tellurium, are not completely replaceable and are not suitable as the group X in the above formula. Hg is here representative of any metal having a valence greater than 1 which will form organo-metallic compounds with the metal bonded to a carbon atom and which compounds are stable toward water; for example metals such as As, Sb, Bi, Au, etc.

The proper choice of the selenyl derivative depends only upon the toxicity of the selenyl compound itself, and whether an extremely soluble preparation is desired. Naturally, in the case of extremely water-insoluble metallic preparations it is necessary to use a selenhydryl derivative containing more than one acid group. The fundamental reaction, however, is the same in all cases, i. e., the union of the metal with the selenium, forming a metallo-organic acid whose alkali metal salts are water soluble: e. g.:

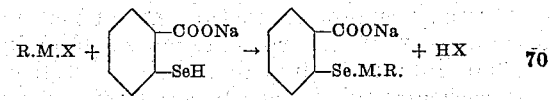

The following examples and methods of procedure merely illustrate my invention but by no means limit it:

As a specific illustration, the invention may be carried out as follows: To 2.6 grams of ethyl mercuric chloride (C$_2$H$_5$.Hg.Cl) suspended in 10 cc. of alcohol, eight-tenths of a gram of sodium hydroxide, dissolved in a small amount of water, is added. The mixture is shaken and treated with 1.9 grams of selenosalicylic acid, dissolved in 5 cc. of alcohol. The following reaction takes place:

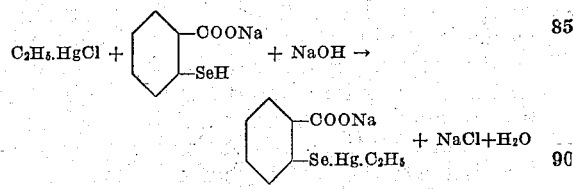

By employing in a similar way seleno glycollic acid, using monomolecular equivalents, the sodium salt of ethyl-mercuro-seleno glycollic acid is produced.

To eliminate the alcohol and make the preparation available for intravenous injection, the solution, as obtained above, is diluted with 100 cc. of water, filtered, if necessary, and treated with a dilute solution of hydrochloric or sulfuric acid. The following reaction then takes place:

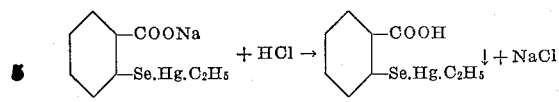

The ethyl mercury selenosalicylic acid is collected on a filter, washed well with water, to remove the alcohol and salts. The well washed precipitate may then be suspended in water and treated with just enough sodium hydroxide to form the sodium salt of the carboxylic acid, i. e.,

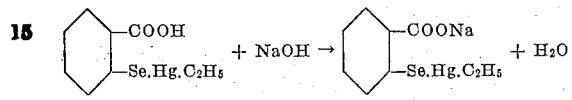

or sodium bicarbonate may be used. In any case the mercurial is in water solution now and immediately available for injection. Other alkaline compounds capable of forming soluble salts with the preparation made may be employed, particularly bases of the alkali metals. The sodium compounds are, however, preferred.

A similar procedure was employed for the preparation of water soluble preparations of butyl mercuric chloride, isomyl mercuric chloride, cyclohexyl mercuric chloride, phenyl mercuric chloride and o-nitraniline p-mercuric chloride.

It is evident also that the alcohol does not play any part in the reaction, except that inasmuch as the mercurials are more soluble in it than in water, in which their solubility is practically nil, it merely accelerates the reaction between the mercurial and the selenyl compound. The same final product, however, is obtained irrespective of the media employed. Thus, acetone may in some cases be advantageously substituted for alcohol.

Equivalent reactions may be utilized for the production of other water soluble mercuri-organic compounds, or water soluble preparations, of other metals, such as arsenic and antimony and others that form stable organo metallic compounds toward water.

In the case of the arsenic and antimony compounds the method is of particular value in making available for therapeutic use the organo metallic derivatives of trivalent arsenic and antimony, which are insoluble, except in very strong alkali, which renders their solutions useless for injection purposes, due to the very high alkalinity.

The following examples and methods merely illustrate my invention in the case of organo metallic derivatives of trivalent arsenic and trivalent antimony, but by no means limit it.

To an alcoholic solution of 2.1 grams of p-dimethyl amino phenyl arsenious oxide, a few droys of hydrochloric acid are added and then 3.8 grams of selenosalicylic acid, dissolved in 50 cc. of alcohol. The whole is shaken for ten minutes, and then diluted with a large volume of water. The product of the reaction precipitates.

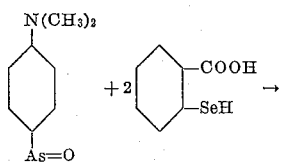

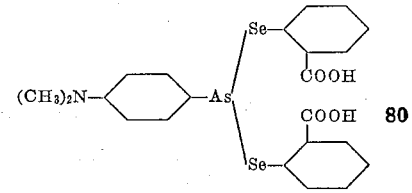

It is washed well with water. It is then suspended in water and brought into solution either by the addition of the calculated amount of sodium hydroxide or by the addition of sodium bicarbonate. In either case a water solution of the organic arsenious oxide compound is immediately available for injection work.

The same final product may also be obtained by treating a water suspension of the p-dimethyl arsenious oxide with selenosalicyclic acid in the presence of a calculated amount of sodium hydroxide or a slight excess of sodium bicarbonate. By similar reactions the corresponding compound of selenosalicycle acid and acetanilide para arsenious oxide may be prepared.

Similar results were obtained with acetanilide p-arsenious oxide.

The organic antimony compounds of trivalent antimony behave toward selenosalicyclic acid similarly, in almost all respects, to those of trivalent arsenic. Thus, by reactions similar to that just set forth, the selenosalicyclic acid derivatives of dimethylaniline para antimonous oxide has been prepared.

Having thus described my invention, I claim:

1. The process of producing water soluble metallic-organic compounds which comprises treating with a solution of an organic compound containing a selenyl group, a compound in which a metal is bonded to a carbon atom of an organic radical and also to a replaceable inorganic radical or group, said metal having a valence greater than 1 and which will form metallic compounds with the metal bonded to a carbon atom, stable toward water.

2. The process of producing water soluble metallic-organic compounds which comprises treating with a solution of an organic compound containing a selenyl (—SeH) group, a compound of the formula R—M—X in which R is any organic radical having the metal attached to a carbon atom, in which X is any replaceable inorganic radical or group; and in which M is any metal having a valence greater than 1 which will form organo-metallic compounds with the metal bonded to a carbon atom, stable toward water.

3. The method of producing a water soluble metallo-organic compound which comprises treating with a solution of a salt of an organic selenyl (—SeH) compound containing an acid group, a compound of the formula R—M—X in which R is any organic radical having the metal attached to a carbon atom, in which X is any replaceable inorganic radical or group, and in which M is any metal having a valence greater than 1 which will form organo-metallic compounds with the metal bonded to a carbon atom, stable toward water.

4. The method of producing a water soluble metallo-organic compound which comprises treating an organo mercuric compound having the formula R—Hg—X in which R is any organic radical having the Hg attached to a carbon atom in which X is any replaceable inorganic radical or group, with a solution of an organic selenyl (—SeH) compound.

5. The method of producing a water soluble metallo-organic compound which comprises treating an organo mercuric compound having the formula R—Hg—X in which R is any organic radical having the Hg attached to a carbon atom in which X is any replaceable inorganic radical or group with a solution of a salt of a selenyl (—SeH) organic acid.

6. A water soluble salt of a compound of the following general formula

R—M(—Se—R$_{Ac}$)$n$ in which R is any organic radical group, R$_{Ac}$ is an organic radical containing an acid group, M is a metal of a group forming compounds stable toward water with the metal bonded to a carbon atom of an organic group and having valence greater than 1, and $n$ is an integer greater than O and at least 1 less than the valence of the metal, the metal and the selenium in the compound being bonded to the carbon atoms of the groups R and R$_{Ac}$ respectively.

7. A water soluble salt of a compound of mercury of the following general formula: R—Hg—Se—R$_{Ac}$ in which R is any aromatic or aliphatic group, R$_{Ac}$ is an organic radical containing an acid group, the Hg and Se atoms being bonded to carbon atoms of the R group and R$_{Ac}$ group respectively.

8. The process of producing a water soluble mercuri-organic compound which comprises treating an organic compound of mercury of the formula: R—Hg—X in which R is any organic radical having the mercury attached to a carbon atom and in which X is any replaceable radical or group, with a water solution of an alkali metal salt of selenosalicyclic acid.

9. The process of producing water soluble mercuri-organic compounds which comprises treating an organic mercuri-chloride with a solution of an alkali metal salt of seleno salicylic acid.

10. The process of producing water soluble mercuri-organic compounds which comprises treating an organic mercuri-chloride with a solution of an alkali metal salt of selenyl organic acid.

11. The method of producing a water soluble metallo-organic compound which comprises treating an organo mercuric compound having the formula R—Hg—X in which R is any organic radical having the Hg attached to a carbon atom in which X is any replacement inorganic radical or group other than of the sulfur family (sulfur, selenium, tellurium) with an alkaline solution of an organic acid containing also a selenyl group (SeH).

12. A water soluble salt of the following acid RHgSe.C$_6$H$_4$.COOH in which R is an organic radical having the mercury directly attached to a carbon atom.

13. A water soluble salt of

C$_2$H$_5$.HgSe.C$_6$H$_4$.COOH.

14. The process of producing a water soluble mercuri organic compound which comprises treating ethyl mercuric chloride with a water solution of an alkaline metal salt of seleno-salicylic acid.

15. The method of producing water soluble metallo-organic compounds, which comprises treating, in a solvent, a compound of the formula R—M—X, in which R is any organic radical having the metal attached to a carbon atom, X is any replaceable inorganic radical or group other than the sulfur family (sulfur, selenium, tellurium) and M is any metal which has a valence greater than 1 and which will form organo-metallic compounds stable toward water and with the metal bonded to a carbon atom, with an organic compound containing a seleno-hydroxyl group (SeH) and an acid-forming group and having the selenyl group bonded to a carbon atom.

16. The method of producing a water soluble mercuric organic compound which comprises treating an organo mercuric compound having the formula R—Hg—X, in which R is any organic radical having the Hg attached to a carbon atom, and in which X is any replaceable inorganic radical or group other than of the sulfur family (sulfur, selenium, tellurium) with an organic compound containing a selenyl group (SeH) and an acid forming group and having the selenium in the selenyl group bonded to a carbon atom.

17. A compound containing a metal which has a greater valence than 1 and which will form organo-metallic compounds stable toward water with the metal bonded to a carbon atom, an organic radical having a carbon atom joined to such metal by one valence bond of the metal, a selenium atom joined by one bond to another valence bond of said metal, and an organic radical containing an acid group, having a carbon atom joined to the other valence bond of the selenium atom.

18. A compound containing mercury, an organic radical having a carbon atom joined to such a mercury by one valence bond of the mercury, a selenium atom joined by one bond to the other valence bond of said mercury, and an organic acid-forming group having a carbon atom joined to the other valence bond of the selenium atom.

MORRIS S. KHARASCH.